United States Patent [19]
Haas et al.

[11] Patent Number: 5,211,962
[45] Date of Patent: May 18, 1993

[54] DEVICE AND PROCESS FOR THE PRODUCTION OF OXIDE-CERAMIC MATERIALS

[75] Inventors: Erwin Haas, Kandern; Heinz-Withold Schmitz, Bochum, both of Fed. Rep. of Germany

[73] Assignee: Lonza-Werke G.m.b.H., Waldshut, Fed. Rep. of Germany

[21] Appl. No.: 81,339

[22] Filed: Aug. 4, 1987

[30] Foreign Application Priority Data

Aug. 15, 1986 [CH] Switzerland ............... 3287/86
Feb. 9, 1987 [CH] Switzerland ............... 461/87

[51] Int. Cl.⁵ ............................................. B22B 1/54
[52] U.S. Cl. ................................. 425/6; 425/369; 425/471
[58] Field of Search ..................... 425/369, 6, 471

[56] References Cited

U.S. PATENT DOCUMENTS

| | | | |
|---|---|---|---|
| 1,989,038 | 1/1935 | Brown | 18/2 |
| 2,258,443 | 10/1941 | Bruker | 425/369 |
| 3,543,333 | 3/1968 | Anders et al. | 18/12 |
| 3,686,376 | 8/1972 | Ayers | 264/40 |
| 4,405,545 | 9/1983 | Septier et al. | 264/144 |

FOREIGN PATENT DOCUMENTS

| | | |
|---|---|---|
| 0057651 | 3/1985 | European Pat. Off. . |
| 0139071 | 5/1985 | European Pat. Off. . |
| 19250 | 6/1956 | Fed. Rep. of Germany ...... 425/369 |
| 1259762 | 8/1968 | Fed. Rep. of Germany . |
| 51-90354 | 7/1976 | Japan . |
| 381380 | 11/1973 | U.S.S.R. ............... 425/369 |

Primary Examiner—James Derrington
Attorney, Agent, or Firm—Fisher, Christen & Sabol

[57] ABSTRACT

Device and process for fast cooling and solidifying of molten materials with a metal oxide base. The device comprises two metal cylinders with parallel axes, which rotate in opposite directions and are cooled. The metal cylinders exhibit a corrugated surface, and an elevation on the surface of one cylinder in each case engages in the recess of the surface of the other cylinder with formation of a gap. The melt is poured into the gap, drawn by force and simultaneously cooled under pressure.

13 Claims, 1 Drawing Sheet

DEVICE AND PROCESS FOR THE PRODUCTION OF OXIDE-CERAMIC MATERIALS

BACKGROUND OF THE INVENTION

1. Field Of The Invention

The invention relates to a device and a process for the production of oxide-ceramic materials by the fast cooling and solidifying of molten materials with a metal oxide base; the device exhibits two horizontally mounted metal cylinders with parallel axes which rotate in opposite directions and are cooled.

2. Background Art

From European Published Patent Application Nos. 0057651 and 0139071 a process and a device are known for the fast solidifying and cooling by continuous casting of molten metal oxides, by the introduction of the molten material into the converging gap, which is formed by two cylinders with parallel axes. The cooling of the molten material must be so controlled that a wedge of molten material continues downward beyond the plane common to the axes of rotation of the cylinders. The process requires a high control expenditure. In the case of the solidifying being too fast, the solidifying limit moves over the plane of the axes of rotation of the cylinders, the solidified material can no longer be delivered, and the cylinders rotate idly. If the cooling rate is lowered, a reliable passage of the material through the cylinder gap is obtained, but the resulting product no longer exhibits the desired crystallinity.

BROAD DESCRIPTION OF THE INVENTION

The main objects of the invention are to avoid the disadvantages of the above-mentioned type of process and device and to provide a device and a process which are easy to manage and which make possible high cooling rates for the metal oxide melt without resulting in interruptions of operations by hasty solidifying.

Such objectives are achieved according to the invention by a device in which the outside of the cylinders exhibits a corrugated surface on the rolling periphery. In each case an elevation on the surface of one cylinder engages in a corresponding recess in the surface of the other cylinder. The two cylinder surfaces at the plane common to the two axes of rotation form a free gap of at least 0.5 mm and at most 10 mm.

In a suitable embodiment, the periphery of the cylinder, following the surface line, is 110 to 157 percent, preferably 120 to 140 percent, of the median periphery of the cylinders. The mean periphery is the periphery which results from the line through the center in each case between the highest point of the elevations and the deepest point of the recesses of the corrugated surface.

The means radius R of the cylinders is suitably 200 to 1000 mm, preferably 400 to 600 mm. The ratio of mean radius R to the radius $R_1$ of the elevation is suitably from 5 to 1 to 20 to 1.

The corrugated surface preferably exhibits in section semicircular elevations with a radius $R_1$ and semicircular recesses with a radius $R_2$, where $R_2$ is equal to $R_1$ plus 0.5 to 10 mm, over the entire periphery.

DETAILED DESCRIPTION OF THE INVENTION

Figure 1:
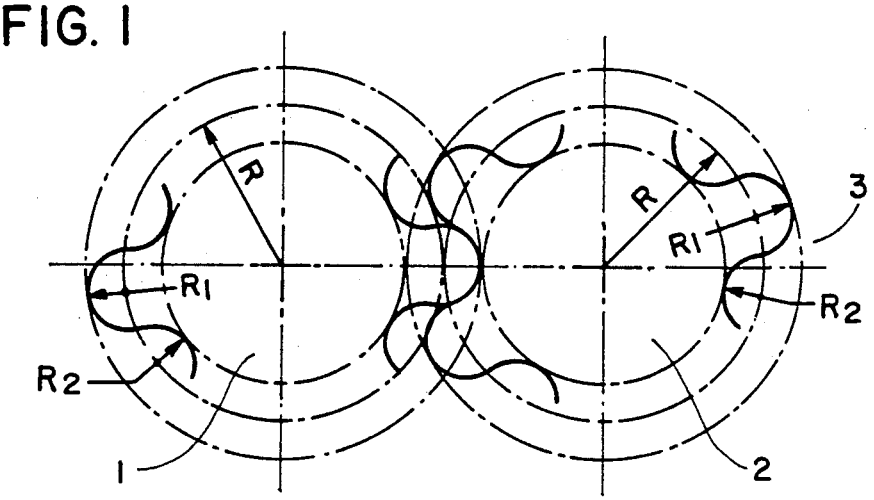
FIG. 1 is a latitudinal cross-sectional view through the cylinders of the invention device.

FIG. 1 shows a section through the two cylinders, 1 and 2, both of which exhibit the same mean radius R. The mean periphery of the cylinders also follows from mean radius R. The corrugated surface (in FIGS. 1 and 2) is shown in a preferred embodiment, by the elevations with a radius $R_1$ exhibiting a semicircular section and the recesses with a radius $R_2$ exhibiting a semicircular section. The cylinders exhibit a common plane 3 at the axes of rotation. By the different sizes of radii $R_1$ and $R_2$, which can be 0.5 to 10 mm, a corresponding gap of 0.5 to 10 mm results on plane 3.

Figure 2:
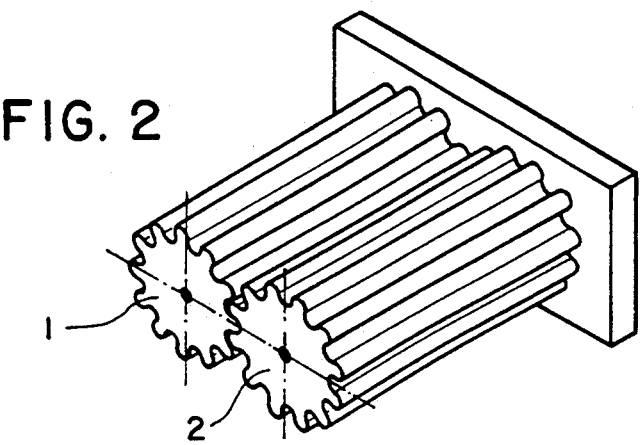
FIG. 2 is a perspective view of the cylinders in reciprocal agreement of FIG. 1.

Cylinders 1 and 2 are also shown in FIG. 2, and the corrugated surfaces are in reciprocal engagement. The two front faces of the two cylinders are provided with sealing elements 4, preferably of metal, graphite or ceramic, (here only the rear sealing element 4 is shown), which prevent a lateral runoff of the melt.

Other embodiments come within the scope of the invention, for example, the corrugated surface on the two edge areas of each cylinder can give way to a round cylindrical section, and the converging sealing elements can project into the gap area between the cylinders on these smooth edge areas.

Further, the sealing elements can be made in round form and mounted directly on the cylinders. Also, the sealing elements, with a radius greater than the cylinder radius, can be mounted to project each on the end of both cylinders or both ends on one cylinder or alternately each only on one face of one cylinder.

Cylinders 1 and 2 are moved in rotation by a drive (not shown) and the cylinders rotate in opposite directions and are driven by a drag gear, a chain drive or the like (not shown), or by synchronization of two drive devices (not shown) simultaneously at the same speed.

Feeding of the melt into the gap area between the cylinders takes place from a furnace or holding crucible (not shown) whose outlet has the shape of a casting spout.

Figure 3:
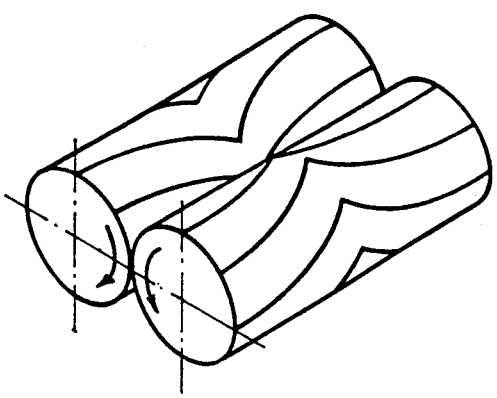
FIG. 3 is a perspective view of another embodiment of the cylinders.
Figure 4:
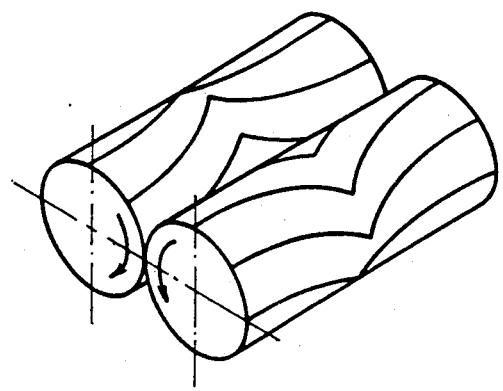
FIG. 4 is a perspective view of a further embodiment of the cylinders.

Another embodiment of the corrugated surface of the cylinders is shown in FIG. 3. Such embodiment has the advantage of attaining an improved feeding of the melt into the cooling area. FIG. 4 shows an embodiment to attain an improved distribution of the melt over the entire width of the cylinders.

An arrangement of the elevations and recesses, which do not run parallel to the cylinder axes, but obliquely to them in the sense of a helical gearing, is also within the scope of the invention and causes a better drawing in of the melt and a limited controllable preliminary crushing.

The axes of the two cylinders are supported on the ends on correspondingly-dimensioned bearings (not shown). For safety and inspection the cylinders can be deflected and withdrawn. The cylinders are provided with cooling devices and can be cooled from within, from without or from both sides.

Gases and liquid known in the art, such as air and water, can be used as cooling media. Circulations, for example, of oils or molten salts can also be used, as well as cooling with gases that are inert in their action.

The cylinders are produced, for example, from steel or copper and generally exhibit a width of 500 to 1500 mm. Any other materials which exhibit a sufficiently high thermal conductivity for carrying off the heat of the melt and sufficient mechanical and thermal stability can also be used.

The width of the cylinders is determined according to the amount of melt which is fed per unit of time. The speed of the cylinders is generally 0.1 to 50 rpm, preferably 0.5 to 5 rpm.

The process according to the invention is performed in the described device so that the melt is poured onto the rollers from a furnace or holding crucible in amounts of 1 to 100 kg/min. at a temperature of about 2400° C. The melt is drawn by force into the roller gap by the driven cylinders and particularly by the surface configuration according to the invention. The melt solidifies on the cylinder surface under the outside pressure of the cylinders in the area of the converging cylinder gap. The solidified material falls by gravity from the working area of the cylinders, and the temperature of the solidified material has fallen below 1600° C. During the entire pouring, the cylinders are intensively cooled from within and, optionally, also from without.

The process according to the invention is suitable for processing of ceramic melts of aluminum oxide in mixture with baddeleyite and/or oxides of zirconium, magnesium, yttrium, calcium and chromium in the form of single or multiple material systems, especially for materials for grinding purposes, as plasma spray powder and as sinter powder for molds.

What is claimed is:

1. Device for fast cooling and solidifying molten materials with a metal oxide base which exhibits two horizontally-mounted metal cylinders having parallel axes of rotation which form a plane, said metal cylinders each having outside surfaces which rotate in opposite directions said device being provided with cooling devices which are adapted to cool said metal cylinders, each outside surface constituting a rolling periphery which is a corrugated surface having consecutive recesses and elevations, one of said elevations of one of said metal cylinders engaging one of said recesses of said other metal cylinder, and said outside surfaces of said metal cylinders at said plane forming a free gap of at least 0.5 mm and at most 10 mm.

2. Device according to claim 1 wherein each of said metal cylinders has a median periphery, and said rolling periphery of each of said metal cylinders is 110 to 157 percent of said median periphery of each of said metal cylinders.

3. Device according to claim 2 wherein each of said metal cylinders has a mean radius R which is 200 to 1000 mm.

4. Device according to claim 2 wherein each of said metal cylinders has a mean radius R which is 400 to 600 mm.

5. Device according to claim 1 wherein each of said metal cylinders has a median periphery, and said rolling periphery of each of said metal cylinders is 120 to 140 percent of said median periphery of each of said metal cylinders.

6. Device according to claim 1 wherein each of said elevations of said corrugated surface of each of said metal cylinders is semicircular in section with a radius $R_1$, each of said recesses of said corrugated surface of each of said metal cylinders is semicircular in section with a radius $R_2$, and $R_2$ is equal to $R_1$ plus 0.5 to 10 mm over all of said rolling periphery of each of said metal cylinders.

7. Device according to claim 6 wherein each of said metal cylinders has a mean radius R, and said mean radius R is in a ratio of 5:1 to 20:1 of said $R_1$ of each of said elevations.

8. Device according to claim 7 wherein said device is provided with two drive devices, each of said drive devices being for driving one of said metal cylinders, and said drive devices being synchronized so as to drive said metal cylinders at the same speed.

9. Device according to claim 1 wherein each of said metal cylinders has a mean radius R which is 200 to 1000 mm.

10. Device according to claim 1 wherein said device is provided with two drive devices, each of said drive devices being for driving one of said metal cylinders, and said drive devices being synchronized so as to drive said metal cylinders at the same speed.

11. Device according to claim 7 wherein said device is provided with a chain drive or drag gear which is adapted to drive said metal cylinders at the same speed.

12. Device according to claim 1 wherein said device is provided with a chain drive or drag gear which is adapted to drive said metal cylinders at the same speed.

13. Device according to claim 12 wherein each of said metal cylinders has a means radius R, all of said mean radius Rs being identical in value.

* * * * *